(12) United States Patent
Bohnes et al.

(10) Patent No.: US 6,537,457 B1
(45) Date of Patent: Mar. 25, 2003

(54) METHOD FOR TREATING CIRCULATING WATER FROM AN ENAMELLING LINE

(75) Inventors: Dirk Bohnes, Kerpen (DE); Johannes Lindemann, Rheinbreitbach Rolandsmuehle (DE); Karl Manderscheid, Cologne (DE)

(73) Assignee: Aware Chemicals L.L.C., Miami, FL (US)

( * ) Notice: Subject to any disclaimer, the term of this patent is extended or adjusted under 35 U.S.C. 154(b) by 0 days.

(21) Appl. No.: 09/601,266

(22) PCT Filed: Jan. 20, 1999

(86) PCT No.: PCT/EP99/00350

§ 371 (c)(1),
(2), (4) Date: Sep. 29, 2000

(87) PCT Pub. No.: WO99/38808

PCT Pub. Date: Aug. 5, 1999

(30) Foreign Application Priority Data

Jan. 28, 1988 (AT) ................................. 140/98

(51) Int. Cl.$^7$ ................................. C02F 1/00
(52) U.S. Cl. ............. 210/698; 210/930; 252/180
(58) Field of Search ............ 252/180; 210/698, 210/930

(56) References Cited

U.S. PATENT DOCUMENTS

| | | | |
|---|---|---|---|
| 5,284,512 A | 2/1994 | Koskan et al. | 106/416 |
| 5,328,690 A | 7/1994 | Sikes | 424/401 |
| 5,373,086 A | 12/1994 | Koskan et al. | 528/328 |
| 568,838 A | 11/1995 | Boehmke et al. | 528/363 |
| 5,490,939 A | 2/1996 | Gerigk et al. | 210/652 |
| 5,515,257 A | 6/1996 | Kleinstuck et al. | 252/181 |
| 5,523,023 A | 6/1996 | Kleinsteuck et al. | 252/542 |
| 5,610,255 A | 3/1997 | Groth et al. | 526/304 |
| 5,658,464 A | 8/1997 | Hann et al. | 210/697 |
| 5,714,558 A | 2/1998 | Groth et al. | 526/312 |
| 5,830,985 A | 11/1998 | Kroner et al. | 528/328 |
| 6,187,195 B1 * | 2/2001 | Zarges et al. | |

FOREIGN PATENT DOCUMENTS

| | | |
|---|---|---|
| DE | 43 05 368 | 8/1994 |
| DE | 43 06 412 | 9/1994 |
| DE | 43 10 503 | 10/1994 |
| DE | 43 23 191 | 12/1995 |
| DE | 44 27 233 | 1/1996 |
| DE | 44 28 639 | 2/1996 |
| EP | 0 474 869 | 3/1992 |
| EP | 0 675 080 | 2/1995 |
| EP | 0 692 459 | 1/1996 |
| WO | WO 98/22205 | 5/1998 |

* cited by examiner

Primary Examiner—Betsey Morrison Hoey
(74) Attorney, Agent, or Firm—Stephen D. Harper

(57) ABSTRACT

Polyaspartic acid and, optionally a non-ionic surfactant, are used to treat circulating water from a paint shop.

15 Claims, 1 Drawing Sheet

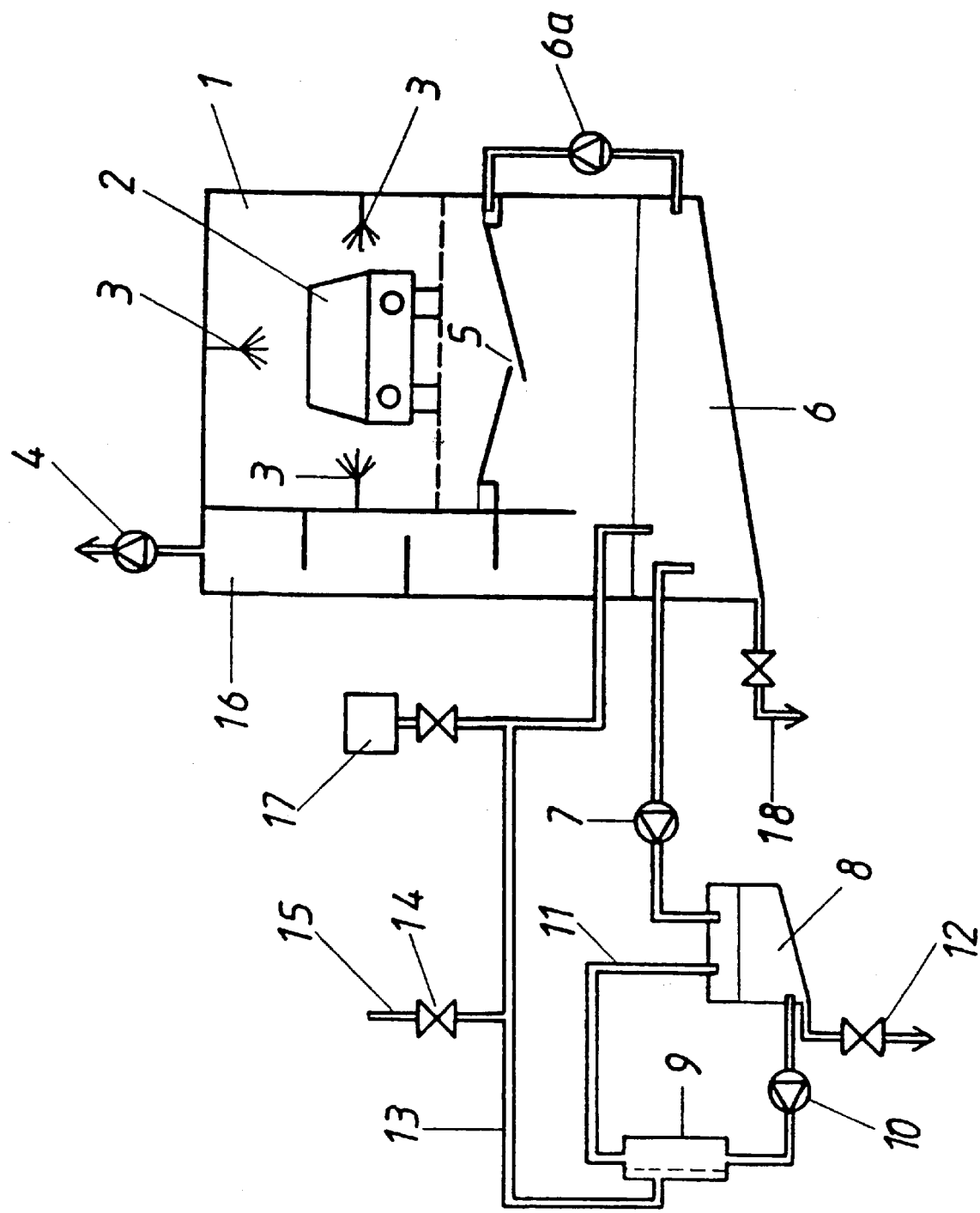

METHOD FOR TREATING CIRCULATING WATER FROM AN ENAMELLING LINE

CROSS REFERENCE TO RELATED APPLICATIONS

This application claims priority under 35 U.S.C. §371 of PCT International Application No. PCT/EP99/00350, filed Jan. 20, 1999, which claims priority to Austrian Application No. 140/98 filed Jan. 28, 1998.

BACKGROUND OF THE INVENTION

This invention relates to a process for treating circuit water from a paint shop from which the paint washed out from the waste air of the paint shop is at least periodically removed.

In order to be able to recover the excess paint which accumulates in paint shops and which is discharged with the waste air from the painting cubicle and washed out from the waste air, it is known (EP 0 675 080 A2) that the paint-laden washing water can be subjected to a multistage membrane filtration process. As a result of this membrane filtration process, the paint removed largely corresponds in its composition and concentration to the waterborne paint used in this known paint shop while the treated, i.e. clean, water is recirculated to the paint shop, so that a water circuit is established via the membrane filtration stage. Unfortunately, the disadvantage of this known process for removing the excess paint washed out from the circuit water is that the paint particles tend to stick to one another and then harden. As a result, paint transported by the circuit water is partly deposited in the pipes and pumps which gradually become blocked. Similarly, paint can also be deposited in the waste air system of the paint shop, with the result that not only are maintenance costs comparatively high, operational problems can also be expected to occur as a result of the paint deposits. In addition, paint consumption can increase and losses of quality can occur.

Paint particles can be prevented from, sticking to one another by using coagulating agents. However, these coagulating agents, which consist of a wax, a polyelectrolyte or a clay product, are filtered out with the paint so that the coagulating agent used has to be continuously supplied in a considerable concentration. Despite the use of coagulating agents, however, the deposition of paint particles and coagulate residues cannot be prevented.

Accordingly, the problem addressed by the present invention was to design a process for treating circuit water from paint shops of the type mentioned at the beginning in such a way that paint particles would be safely prevented from sticking to one another, thus providing for low-maintenance and largely trouble-free operation.

SUMMARY OF THE INVENTION

According to the invention, the solution to the problem stated above is characterized in that polyaspartic acid is added to the circuit water.

The novel use of polyaspartic acid, which is produced in known manner (DE 43 05 368 A1, DE 43 06 412 A1, DE 43 10 503 A1, DE 43 23 191 A1, DE 44 27 233 A1, DE 44 28 639 A1) and which is otherwise used above all as a detergent additive, surprisingly prevents paint particles from sticking to one another, so that pipes, pumps or other parts of the paint shop equipment which come into contact with the paint-laden circuit water remain free from deposits. Since, in addition, the polyaspartic acid remains dissolved in the water and, accordingly, is circulated with the circuit water, it is merely necessary to replace the polyaspartic acid lost either through the evaporation of water or with the very small amount of water removed with the paint. There is presumably no need to place any particular emphasis on the fact that any auxiliaries required, such as solubilizers, wetting agents, corrosion inhibitors or biocides and—particularly in the case of waterborne paints—foam inhibitors, may be added to the circuit water with the polyaspartic acid.

DESCRIPTION OF THE PREFERRED EMBODIMENTS

The polyaspartic acid is preferably added to the circuit water in the form of an aqueous solution of an alkali metal or ammonium salt of polyaspartic acid. For example, a 40% by weight solution of the sodium salt of polyaspartic acid may be used for this purpose, being added to the circuit water in a quantity of preferably 0.5 to 5% by volume.

Particularly favorable process conditions are established if the concentration of the polyaspartic acid in the circuit water is kept constant by correspondingly making up the circuit losses. It has been found in practice that a concentration of polyaspartic acid of 2 to 5% by volume in the circuit water advantageously satisfies the usual requirements. With a polyaspartic acid concentration such as this, paint particles can readily be prevented from sticking to one another up to a paint content of the circuit water of 10% by volume or higher. If necessary, the polyaspartic acid concentration may be adapted to the particular paint load of the circuit water.

Particularly in the separation of solvent-based paints and optionally in the case of water-based paints ("waterborne paints") also, it is advisable to add one or more anionic surfactants to the circuit water in addition to the polyaspartic acid. These anionic surfactants may be selected, for example, from alkyl sulfates, alkyl sulfonates, alkyl benzenesulfonates and alkyl ether sulfates. Alkyl sulfonates are particularly preferred.

The anionic surfactants are preferably added to the circuit water in a quantity of about 0.02 to 0.75% by weight, based on the circuit water. In the case of water-based paints, additions of anionic surfactants in the lower concentration range, for example between about 0.02 and about 0.35% by weight, are sufficient while quantities of about 0.05 to about 0.75% by weight are preferred for solvent-based paints.

The present invention also relates to a composition which may be used to carry out the process according to the invention. This composition contains both polyaspartic acid or an alkali metal or ammonium salt thereof, for example its sodium salt, and one or more anionic surfactants. The ratio by weight of a) polyaspartic acid or an alkali metal or ammonium salt thereof and b) one or more anionic surfactants is preferably in the range of 4:1 to 20:1 (a:b). Where the composition is used for water-based paints, the ratio by weight is preferably in the range from 10:1 to 20:1 whereas, for solvent-based paints, it is preferably in the range from 4:1 to 10:1. The composition may consist of components a) and b) only. However, it may also be a solution, preferably an aqueous solution, of components a) and b) in the quantity ratio indicated. In this composition, the anionic surfactants may be selected for example from alkyl sulfates, alkyl sulfonates, alkyl benzene sulfonates and alkyl ether sulfates. Alkyl sulfonates are particularly preferred. The composition may also contain solubilizers, wetting agents, corrosion inhibitors or biocides and—particularly in the case of water-based paints—foam inhibitors.

The process according to the invention is described in more detail in the following with reference to the accompany drawing which is a block diagram of an arrangement for treating circuit water from a paint shop.

In the paint shop 1, an article 2 to be painted is painted by means of spray nozzles 3. The sprayed excess of paint used, which is not deposited on the article 2, is removed from the paint shop 1 by means of a suction fan 4 and is washed out with water from the air thus extracted. To this end, a film of water flows through the suction slot 5, being reduced to fine droplets by the reduced pressure and the resulting waste air stream. The water mist thus formed is used to wash out the paint particles which are discharged from the paint shop 1 with the waste air and which are separated from the waste air with the water droplets entrained by the airstream via deflector plates or droplet separators and collected in a tank 6 from which the liquid removed is recirculated by a pump 6a to the suction slot. The paint-laden washing water is pumped (pump 7) from the tank 6 to a concentrate tank 8 from which the water/paint mixture is delivered by a pump 10 to a separator 9, for example in the form of a single-stage or multistage membrane filtration module. The paint retained in the separator 9 is returned through a return pipe 11 to the concentrate tank 8, so that the paint is concentrated in the concentrate tank 8 until the concentrate is removed from the concentrate tank 8 through a drainage valve 12 after a certain paint concentration has been reached.

The washing water largely freed from paint in the separator 9 returns as circuit water to the tank 6. A connecting pipe 15 for added water opens via a valve 14 into the return pipe 13 for the clean circuit water so that losses of water occurring in the circuit can be made up. Such losses of water occur whenever concentrate is discharged through the drainage value 12 or as a result of evaporation. Evaporated washing liquid is also removed through the waste air system 16 of the paint shop 1 connected to the suction fan 4.

Alternatively to membrane filtration, the paint particles may also be mechanically separated from the washing water, for example by a continuously or discontinuously operating centrifuge or a separator.

In order to prevent the paint particles from sticking to one another and, hence, to avoid the deposition of paint residues in the pipes and pumps and in the waste air system 16, polyaspartic acid is added to the circuit water, preferably in a concentration of 2 to 5% by volume. This addition of polyaspartic acid effectively prevents the paint particles from sticking to one another, so that deposits of paint particles in parts of the paint shop equipment which come into contact with the washing or circuit water are avoided. Since the polyaspartic acid added is dissolved in the water, it is circulated with the circuit water and need only be replenished in the event of water losses. To this end, a dispenser 17 is provided for adding the quantity of polyaspartic acid to be replenished to the return pipe 13 for the treated, i.e. clean, circuit water. If auxiliaries, for example solubilizers, wetting agents, corrosion inhibitors or biocides, are added to the circuit water, they, too, will of course have to be replenished accordingly.

A substantially constant concentration of the polyaspartic acid, which has proved to be of advantage for the desired effect, can readily be maintained through the measures described in the foregoing. By adding polyaspartic acid to the circuit water, the paints used can advantageously be floated, sedimented or dispersed according to their properties, which is of crucial importance in connection, for example, with the separation of paint by sedimentation or centrifugation or by membrane filtration.

In the interests of completeness, it is pointed out that the tank 6 can be emptied as and when required through a pipe 18. In addition, the tank 6 can be followed by another tank as pump receiver. Finally, it is pointed out that the paint can be removed from the circuit water not only continuously, but also if necessary at intervals after a certain concentration has been reached.

What is claimed is:

1. A method for treating circulating water from a paint shop, the circulating water containing paint washed out from waste air of the paint shop, the method comprising adding polyaspartic acid or a salt thereof to the circulating water, and removing paint from the circulating water.

2. The method of claim 1 further comprising maintaining a constant concentration of polyaspartic acid or salt thereof in the circulating water.

3. The method of claim 1 wherein the step of adding polyaspartic acid or salt thereof comprises adding one or more compounds selected from the group consisting of alkali metal salts of polyaspartic acid, ammonium salts of polyaspartic acid and aqueous solutions and mixtures thereof.

4. The method of claim 3 wherein the step of adding polyaspartic acid or salt thereof comprises adding an aqueous solution of a sodium salt of polyaspartic acid.

5. The method of claim 4 wherein the step of adding polyaspartic acids or salt thereof comprises adding polyaspartic acid in a quantity of about 0.5 to about 5% by volume based on a 40% by weight of the aqueous solution of the sodium salt.

6. The method of claim 1 wherein the step of adding polyaspartic acid or salt thereof comprises adding polyaspartic acid to the circulating water in an amount sufficient to provide a concentration of polyaspartic acid or salt thereof in the circulating water of from about 2 to about 5% by volume.

7. The method of claim 1 further comprising the step of adding one or more anionic surfactants to the circulating water.

8. The method of claim 7 wherein the step of adding anionic surfactants comprises adding one or more anionic surfactant selected from the group consisting of alkyl sulfates, alkyl sulfonates, alkyl benzene sulfonates and alkyl ether sulfates.

9. The method of claim 7 wherein the step of adding anionic surfactants comprises adding an anionic surfactant to the circulating water in an amount sufficient to provide a concentration of anionic surfactant from about 0.02 to about 0.75% by weight based on the circulating water.

10. The method of claim 1 wherein the step of removing paint from the circulating water comprising removing paint by membrane filtration.

11. A composition comprising:
 a) water containing paint washed out from waste air of a paint shop;
 b) a polyaspartic acid or a salt thereof; and
 c) at least one anionic surfactant.

12. The composition of claim 11 wherein the polyaspartic acid or salt thereof is selected from the group consisting of alkali metal salts of polyaspartic acid, ammonium salts of polyaspartic acid and aqueous solutions and mixtures thereof.

13. The composition of claim 11 wherein the polyaspartic acid or salt thereof is present in an amount from about 2 to about 5% by volume.

14. The composition of claim 11 wherein the anionic surfactant is selected from the group consisting of alkyl sulfates, alkyl sulfonates, alkyl benzene sulfonates, alkyl ether sulfates and aqueous solutions and mixtures thereof.

15. The composition of claim 11 wherein the anionic surfactant is present in an amount from about 0.02 to about 0.75% by weight of the composition.

* * * * *

UNITED STATES PATENT AND TRADEMARK OFFICE
CERTIFICATE OF CORRECTION

PATENT NO. : 6,537,457 B1
DATED : March 25, 2003
INVENTOR(S) : Bohnes et al.

It is certified that error appears in the above-identified patent and that said Letters Patent is hereby corrected as shown below:

Title page,
Item [30], Foreign Application Priority Data, delete "1998", and insert therefor -- 1998 --.

Column 4,
Line 35, delete "acids" and insert therefor -- acid --.

Signed and Sealed this

Twelfth Day of August, 2003

JAMES E. ROGAN
*Director of the United States Patent and Trademark Office*